Figure 2:
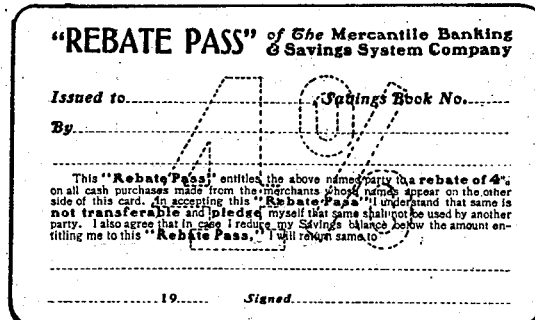

No. 702,007.

C. T. INMAN.
DEPOSIT CREDIT BOOK.
(Application filed Mar. 22, 1902.)

Patented June 10, 1902.

(No Model.)

2 Sheets—Sheet 1.

*Fig.1.*

Witnesses:
Walter Bowman
Maude Zwisler

Inventor:
Charles T. Inman,
by Humphry & Humphry,
Attorneys.

No. 702,007.  
C. T. INMAN.  
DEPOSIT CREDIT BOOK.  
(Application filed Mar. 22, 1902.)  
Patented June 10, 1902.

(No Model.)  
2 Sheets—Sheet 2.

Witnesses:  
Inventor:  
Charles T. Inman,  
By Humphry & Humphry,  
Attorneys.

UNITED STATES PATENT OFFICE.

CHARLES T. INMAN, OF AKRON, OHIO.

DEPOSIT-CREDIT BOOK.

SPECIFICATION forming part of Letters Patent No. 702,007, dated June 10, 1902.

Application filed March 22, 1902. Serial No. 99,435. (No model.)

*To all whom it may concern:*

Be it known that I, CHARLES T. INMAN, a citizen of the United States, residing at Akron, in the county of Summit and State of Ohio, have invented a certain new and useful Improvement in Deposit-Credit Books, of which the following is a specification.

My invention has relation to improvements in deposit-credit books of savings-banks or banks conducting a savings-department in which the depositor receives interest on his money on deposit and in which the amount of balance remaining to his credit is taken as the basis for the issuing to him of certain rebate-cards associated with said books. This system contemplates an association or understanding between the bank and merchants in the community whereby the depositor at the bank receives a rebate on the amount of any purchase from said merchants, which rebate is to vary with the amount of the deposit in the bank. It also contemplates that the bank shall have cards of different kinds readily distinguishable, preferably by having them of different colors, which shall indicate at a glance the amount of the deposit and the amount of rebate to which the depositor is entitled on his purchases, and give one of these cards to the depositor in accordance with the amount of his deposit and withdraw this card and issue a different one appropriate to the increase or decrease of the deposit, which card becomes patent evidence of amount of rebate to which the depositor is entitled from the merchant.

The object of my invention is to provide a deposit-book suitably arranged for keeping the account of the depositor which shall indicate the issue and kind of card the depositor has and an associated system of cards to be issued to the dispositor and to be used by him when making his purchase of the merchant.

To the accomplishment of the aforesaid object, my invention consists in certain columns, spaces, and lines upon the account-book pages peculiarly arranged and designated to carry out the aforesaid object; and it further consists in the combination, with a book provided with such columns, of associated cards containing words and figures to indicate the amount of rebate in making the purchase, as hereinafter described, and illustrated in the accompanying drawings, and specifically distinguished in the claims.

Figure 3:
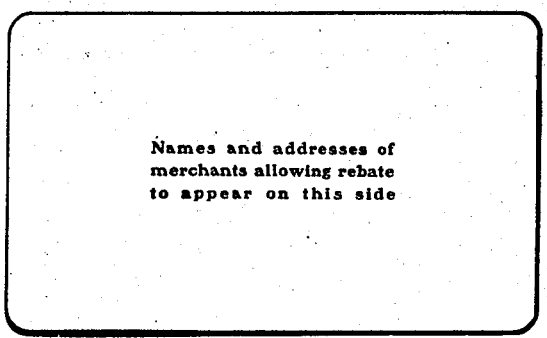

In the accompanying drawings, Figure 1 represents two pages of a deposit-credit book embodying my invention and having a few entries illustrative of its manner of use, and Fig. 2 and Fig. 3 views of the face and back of one of the cards adapted to be issued in connection with the book to be used in making purchases to secure the appropriate rebate on the price.

In Fig. 1 each page contains spaces for the number of the account, the letter of the ledger, the name of the bank, a line to indicate the depositor's name, and a line to indicate the system. These entries are not arbitrary or restrictive, but are used for the purpose of illustration and may be changed or modified slightly without departing from my invention. Below these entries are vertical columns for the entry of date of withdrawal, the amount deposited, the balance to the credit of the depositor, with its date, and the kind of card issued, which for the purpose of this application is called a "rebate pass."

In Fig. 2 the card, which is preferably of tough material to endure wear and with rounded corners to prevent catching in the pocket or pocket-book, has on its face in large characters, but in pale ink not readibly reproduced in a drawing, the amount of rebate to which it entitles the holder, with the title "Rebate pass" in prominent figures, with the name of the system, with blanks for the name of the depositor, the number of his account-book, and the name of the bank issuing. Below in fine letters are the statements and conditions of its issue with its effect, and below spaces for the name of the issuing bank, the date of issue, and the signature of the name of the depositor, the whole forming a contract. On the back of the card are spaces for the names and addresses of the merchants allowing the rebate.

An inspection of the account of course notifies the bank of the kind of card to be issued or last issued, while the card indicates to the merchant what degree of rebate the purchaser is entitled to. It thus becomes an incentive to the depositor to have his money with the bank, to increase the amount of his deposit, and an inducement to the merchant to patronize the same bank.

The incentive to the bank to adopt the system is that it can guarantee to each and every one of its savings depositors a rebate on all of their purchases with any of the merchants with whom the bank has entered into contractual relations, and thereby increase the desire among non-depositors to become depositors, thus increasing in the bank's possession more available ready cash for use in other business, and as the average saving deposits of banks are more permanent and less liable to sudden withdrawal it becomes of great importance to them to increase this branch of their business.

The incentive to the merchant to adopt this system is that by entering into relations with the bank the numerous savings depositors are drawn to him in order to avail themselves of the rebate guaranteed to them by the cards issued by the bank. Another advantage in this system is that all purchases shall be for cash, thereby saving time and money necessary to collect credit accounts, thereby decreasing the bookkeeping of the merchant, as no memoranda of the rebates granted need be kept. The merchant is under obligation by virtue of his contract with the bank to grant to a purchaser who is a depositor of the bank the rebate called for by the depositor's card. The merchant being desirous of obtaining as his customers the depositors of a savings-bank is compelled to grant these rebates called for by the bank's cards. The kind of card issued to the depositor will be arbitrarily decided by his balance with the bank, and the contract entered into between the merchant and the bank contemplates that even the cards calling for the greatest rebate shall still leave the merchant a legitimate profit, and as the number of cards granting low rates will greatly exceed those of the higher rebate the merchant is compensated by the increased volume of business turned in his direction by the use of these cards.

This system, based as it is upon my improved account-book and associated cards, provides for a mutual benefit to be derived by all parties, and therefore the merchant is willing and under the contract must grant to the thrifty depositor who increases his savings at the bank a larger rebate, and he is justified in so doing by the fact that as the amount of rebate to which the depositor is entitled increases it will have a constant tendency to encourage his purchasing more extensively.

The incentive to the depositor is of course to deposit money with the bank to secure rebates on his purchases and to steadily increase his balance at the bank, to the end that he may secure from the merchants under contract with the bank as great a rebate or discount for cash purchases as is possible. The merchant is secured from fraud in the use by a depositor of a higher rebate-card than his bank-balance entitles him to by the fact that he must, in order to withdraw money on deposit with the bank, present to the cashier of the bank not only his individual savings-deposit book, but also his rebate-card, which can then be exchanged by the bank official for one properly representing his balance on deposit.

Having thus described my invention, what I claim, and desire to secure by Letters Patent, is—

1. An improved account-book, the pages of which have appropriately-headed columns for entries showing the dates and amounts of deposits and withdrawals, with the net balance and date of issue and kind of rebate-cards issued, substantially as shown and described and for the purpose specified.

2. The combination with an account-book having columns for entries indicating the dates and amounts of deposit and withdrawals, the net balances resulting therefrom and the date and kind of rebate-cards issued on said net balances, of rebate-cards bearing on their exterior indicia corresponding to the entries on said rebate-column, substantially as shown and described.

In testimony that I claim the above I hereunto set my hand in the presence of two subscribing witnesses.

CHARLES T. INMAN.

In presence of—
C. E. HUMPHREY,
MAUDE ZWISLER.